US012759315B2

(12) United States Patent
Yamazaki

(10) Patent No.: US 12,759,315 B2
(45) Date of Patent: Oct. 13, 2026

(54) PRINTING APPARATUS

(71) Applicant: SEIKO EPSON CORPORATION, Tokyo (JP)

(72) Inventor: Shinya Yamazaki, Asahi-mura (JP)

(73) Assignee: Seiko Epson Corporation, Tokyo (JP)

( * ) Notice: Subject to any disclaimer, the term of this patent is extended or adjusted under 35 U.S.C. 154(b) by 174 days.

(21) Appl. No.: 18/433,096

(22) Filed: Feb. 5, 2024

(65) Prior Publication Data

US 2024/0262111 A1 Aug. 8, 2024

(30) Foreign Application Priority Data

Feb. 6, 2023 (JP) ................................ 2023-016235

(51) Int. Cl.
*B41J 11/00* (2006.01)

(52) U.S. Cl.
CPC ........ *B41J 11/0022* (2021.01); *B41J 11/0024* (2021.01); *B41J 11/0025* (2013.01)

(58) Field of Classification Search
CPC . B41J 11/002; B41J 11/0022; B41J 11/00224; B41J 11/0024; B41J 11/0025; B41J 29/377
USPC .......................................................... 347/102
See application file for complete search history.

(56) References Cited

U.S. PATENT DOCUMENTS

2010/0110156 A1* 5/2010 Hara .................. B41J 11/00222 347/102
2010/0141725 A1* 6/2010 Shiohara .............. B41J 11/0015 347/102
2011/0037819 A1 2/2011 Mizutani
2013/0050376 A1* 2/2013 Houjou ................ B41J 11/0022 347/104
2019/0001707 A1* 1/2019 Yoda .................. B41J 11/00216

FOREIGN PATENT DOCUMENTS

JP 3590847 B2 * 11/2004
JP 2011-037143 A 2/2011
WO WO-2015199673 A1 * 12/2015 ............ B41J 29/377
WO WO-2022025115 A1 * 2/2022 ............. H05B 6/686

OTHER PUBLICATIONS

JP 3590847 B2 machine translation (Year: 2025).*
Machine translation of WO 2022025115 A1 (Year: 2026).*

* cited by examiner

*Primary Examiner* — Stephen D Meier
*Assistant Examiner* — Thomas Ray Knief
(74) *Attorney, Agent, or Firm* — WORKMAN NYDEGGER

(57) ABSTRACT

A printing apparatus includes a conveying unit that conveys a medium, a printing unit that ejects ink onto the medium, and a drying unit dries the ink ejected from the printing unit to the medium. The drying unit includes a support portion that supports the medium, an airflow generating unit that generates an airflow, a blowout port for airflows that is disposed at a position facing the image forming surface of the medium conveyed by the conveying unit and blows out the airflow, and an airflow direction determining portion that determines an air blowing direction that is a direction toward which the airflow blown out from the blowout port is directed. The air blowing direction is inclined with respect to an opposing direction in which the blowout port faces the image forming surface as viewed from the conveying direction.

13 Claims, 11 Drawing Sheets

REERENCE EXAMPLE

REFERENCE EXAMPLE

PRINTING APPARATUS

The present application is based on, and claims priority from JP Application Serial Number 2023-016235, filed Feb. 6, 2023, the disclosure of which is hereby incorporated by reference herein in its entirety.

BACKGROUND

1. Technical Field

The present disclosure relates to a printing apparatus.

2. Related Art

Hitherto, various types of printing apparatuses have been used. Among them, there is a printing apparatus including a drying unit that dries ink ejected onto a medium by blowing an airflow onto a medium. For example, JP-A-2011-37143 discloses a recording apparatus including an air blowing device that blows air to a medium in order to dry ink ejected onto the medium.

In a printing apparatus such as the recording apparatus disclosed in JP-A-2011-37143, which includes a drying unit that dries ink ejected onto a medium by blowing an airflow onto the medium, there is a case in which unevenness occurs in the distribution of wind speeds on the medium and unevenness occurs in drying of the ink ejected onto the medium. When the drying unevenness of the ink ejected onto the medium becomes remarkable, there is a concern that the printing quality may deteriorate.

SUMMARY

A printing apparatus according to the present disclosure for solving the above problem includes a conveying unit that conveys a medium, a printing unit that ejects ink onto an image forming surface of the medium conveyed by the conveying unit, and a drying unit that is disposed downstream of the printing unit in a conveying direction of the medium and dries the ink ejected from the printing unit onto the image forming surface. The drying unit includes a support portion that supports the medium, an airflow generating unit that generates an airflow, a blowout port that is disposed at a position facing the image forming surface of the medium conveyed by the conveying unit and blows out the airflow, and an airflow direction determining portion that determines an air blowing direction that is a direction toward which the airflow blown out from the blowout port is directed. The air blowing direction is inclined with respect to an opposing direction in which the blowout port faces the image forming surface as viewed from the conveying direction.

DESCRIPTION OF EMBODIMENTS

Figure 1:
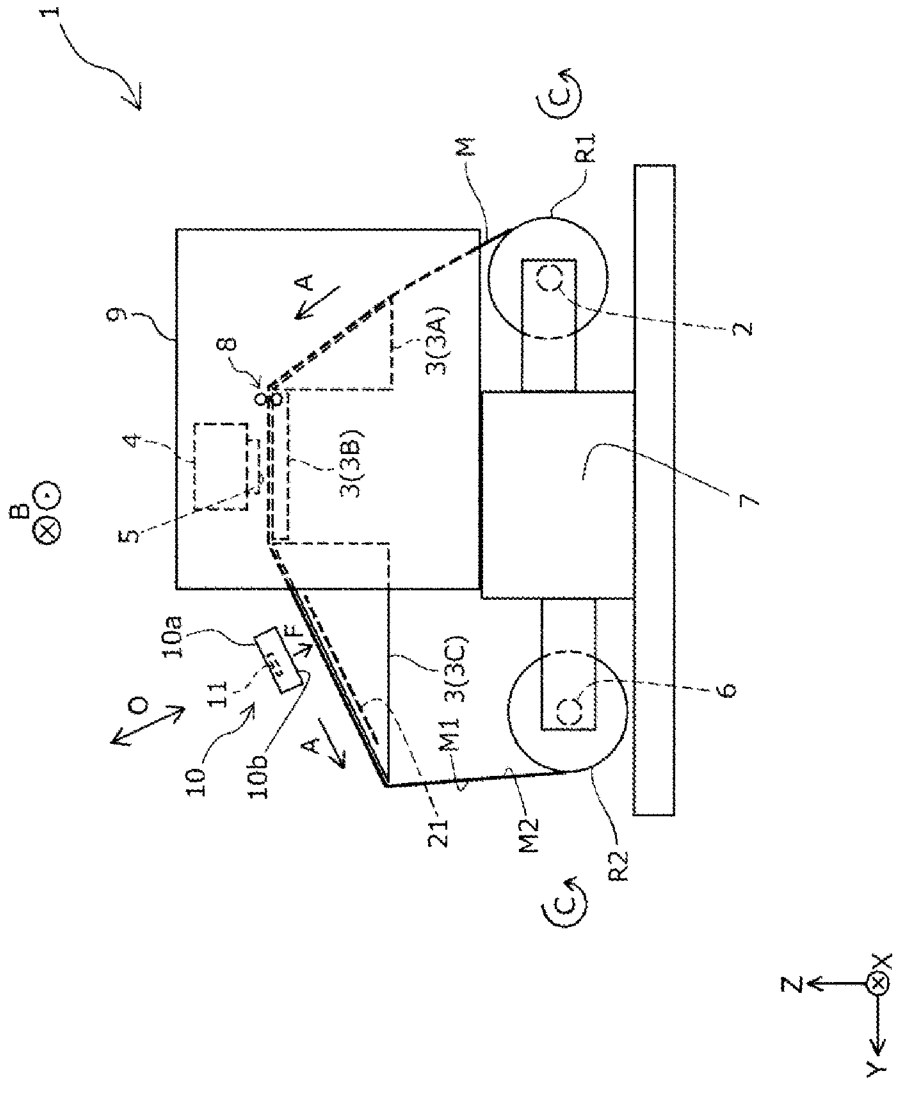
FIG. 1 is a schematic view of a printing apparatus according to an embodiment of the present disclosure.

First, the present disclosure is schematically described.

A printing apparatus according to a first aspect of the present disclosure for solving the above problem includes a conveying unit that conveys a medium, a printing unit that ejects ink onto an image forming surface of the medium conveyed by the conveying unit, and a drying unit that is disposed downstream of the printing unit in a conveying direction of the medium and dries the ink ejected from the printing unit onto the image forming surface. The drying unit includes a support portion that supports the medium, an airflow generating unit that generates an airflow, a blowout port that is disposed at a position facing the image forming surface of the medium conveyed by the conveying unit and blows out the airflow, and an airflow direction determining portion that determines an air blowing direction that is a direction toward which the airflow blown out from the blowout port is directed. The air blowing direction is inclined with respect to an opposing direction in which the blowout port faces the image forming surface as viewed from the conveying direction.

When the air blowing direction is perpendicular to the opposing direction in which the blowout port faces the image forming surface as viewed from the conveying direction, a large difference occurs in wind speed between the region facing the blowout port and the region not facing the blowout port, and unevenness occurs in the wind speed distribution. However, according to the present aspect, the printing apparatus includes the airflow direction determining portion that determines an air blowing direction, and the air blowing direction is inclined with respect to the opposing direction in which the blowout port faces the image forming surface as viewed from the conveying direction. With such a configuration, it is possible to suppress occurrence of a large difference in wind speed between the region facing the blowout port and the region not facing the blowout port. Therefore, the ink ejected on the medium can be dried while drying unevenness is suppressed.

A printing apparatus according to a second aspect of the present disclosure is an aspect dependent on the first aspect, in which the airflow generating unit includes a plurality of fans arranged in a direction intersecting the conveying direction.

According to the present aspect, the airflow generating unit includes a plurality of fans arranged in a direction intersecting the conveying direction. Thus, ink can be efficiently dried with the plurality of fans. When the airflow generating unit has a configuration in which the plurality of fans are arranged in a direction intersecting the conveying direction, the region facing the blowout port and the region not facing the blowout port increase, so that drying unevenness may easily occur. However, since the air blowing direction is inclined with respect to the opposing direction in which the blowout port faces the image forming surface as viewed from the conveying direction, it is possible to suppress the occurrence of a large difference in wind speed between the region facing the blowout port and the region not facing the blowout port and dry the ink ejected on the medium while suppressing the drying unevenness.

A printing apparatus according to a third aspect of the present disclosure is dependent on the second aspect, in which the blowout port and the airflow direction determining portion are provided for each of the plurality of fans.

According to the present aspect, the blowout port and the airflow direction determining portion are provided for each of the plurality of fans. Therefore, for example, it is possible to adjust the wind direction by the airflow direction determining portion and replace the airflow direction determining portion for each of the plurality of fans.

A printing apparatus according to a fourth aspect of the present invention is dependent on any one of the first to third aspects, in which the air blowing direction is inclined from upstream to downstream in the conveying direction when viewed from the opposing direction.

According to the present aspect, the air blowing direction is inclined from the upstream to the downstream in the conveying direction when viewed from the opposing direction. With such a configuration, it is possible to prevent an airflow from moving toward the printing unit and the ink ejection position from being shifted and to prevent a warm airflow from moving toward the printing unit and causing a temperature rise around the printing unit.

A printing apparatus according to a fifth aspect of the present invention is dependent on the third aspect, wherein the air blowing direction is inclined from upstream to downstream in the conveying direction when viewed from the opposing direction, and the airflow direction determining portion on the upstream in the air blowing direction is disposed on the upstream in the conveying direction.

According to the present aspect, in the configuration including the plurality of airflow direction determining portions, the air blowing direction is inclined from the upstream toward the downstream in the conveying direction when viewed from the opposing direction, and the airflow direction determining portion located more upstream in the air blowing direction is disposed more upstream in the conveying direction. With such a configuration, it is possible to prevent an airflow from moving toward the printing unit and the ink ejection position from being shifted and to prevent a warm airflow from moving toward the printing unit and causing a temperature rise around the printing unit. In addition, it is possible to prevent the generation of a portion where an airflow stagnates due to interference with an airflow from the adjacent airflow direction determining portion. Note that "the airflow direction determining portion located more upstream in the air blowing direction is disposed more upstream in the conveying direction." includes not only a case in which all of the plurality of airflow direction determining portions are gradually shifted to the upstream in the air blowing direction, but also a case in which some of the plurality of airflow direction determining portions are arranged so as not to be shifted in the air blowing direction.

A printing apparatus according to a sixth aspect of the present disclosure is dependent on any one of the first to third aspects, in which a first medium and a second medium having different lengths in a width direction intersecting the conveying direction configured to be used as the media, and the media are conveyed while the first medium and the second medium are positioned at the same position on one side in the width direction, the air blowing direction is inclined from the one side to the other side in the width direction when viewed from the conveying direction.

According to the present aspect, the first medium and the second medium having different lengths in the width direction can be used as the media, and the air blowing direction is inclined from one side to the other side in the width direction when viewed from the conveying direction. In a configuration in which the first medium and the second medium having different lengths in the width direction can be used as the media, when any one of the media is used and, for example, an end portion of the medium in the width direction is located in a region not facing the blowout port, the end portion easily curls back under the influence of the airflow. However, by generating an airflow so as to be directed from one side, which is a side where the medium is positioned in the width direction, to the other side, it is possible to prevent the end portion of the medium in the width direction from being turned up under the influence of the airflow regardless of using any of the media having different lengths in the width direction.

A printing apparatus according to a seventh aspect of the present invention is an aspect dependent on any one of the first to third aspects and includes a medium heating unit that heats the medium from a side opposite to the image forming surface.

According to the present aspect, the image forming apparatus includes the medium heating unit that heats the medium from the side opposite to the image forming surface. Therefore, by heating the medium from the side opposite to the image forming surface, it is possible to particularly efficiently dry the ink ejected onto the medium while suppressing drying unevenness.

A printing apparatus according to an eighth aspect of the present disclosure is an aspect dependent on any one of the first to third aspects and includes an airflow heating unit that heats the airflow.

According to the present aspect, the printing apparatus includes an airflow heating unit that heats an airflow. Therefore, by heating an airflow, it is possible to particularly efficiently dry the ink ejected onto a medium while suppressing drying unevenness.

Embodiments according to the present disclosure will be described in detail below with reference to the accompanying drawings. First, with reference to FIG. 1, an overview of a printing apparatus 1 according to an embodiment of the present disclosure will be described. Referring to FIG. 1, some constituent members are simplified and omitted for easy understanding of the configuration. Here, in the accompanying drawings, an X-axis direction is a horizontal direction and a direction in which the support portion of a holding unit 2 extends. The holding unit 2 holds a roll body R1 obtained by winding a medium M into a roll shape. A Y-axis direction is a horizontal direction, the front-and-rear direction of the printing apparatus 1, and a direction orthogonal to the X-axis direction. A Z-axis direction is a vertical direction. Further, hereinafter, it is assumed that an arrow direction is a + direction, and a direction opposite to the arrow direction is a − direction. For example, it is assumed that a vertically upward direction is a +Z-direction, a vertically downward direction is a −Z-direction, the forward direction of the printing apparatus 1 is a +Y-direction, and the rearward direction of the printing apparatus 1 is a −Y-direction.

The printing apparatus 1 of the present embodiment includes a main body unit 9. Legs 7 are attached to both the end parts of the main body unit 9 in the X-axis direction. Further, the printing apparatus 1 according to the present embodiment includes the holding unit 2 that holds the roll body R1 obtained by winding the medium M into a roll shape on a side in the −Y direction, which corresponds to the rear side of the main body unit 9. The holding unit 2 serves as a feeding unit that feeds the medium M from the roll body R1 to the main body unit 9.

Further, in the printing apparatus 1 according to the present embodiment, when the medium M is conveyed in a conveying direction A, the holding unit 2 serving as a rotating shaft along the X-axis direction rotates in a rotating direction C. The holding unit 2 is a member to be inserted into a paper core as the winding core of the roll body R1. Referring to FIG. 1, the roll body R1 wound so that an image forming surface M1 on which an image is formed is on the outer side is used, but when the roll body R1 wound so that the image forming surface M1 is on the inner side is used, the holding unit 2 can rotate in a direction opposite to the rotating direction C to feed the medium M from the roll body R1.

Further, the printing apparatus 1 according to the present embodiment includes a conveyance path of the medium M. The conveyance path includes a medium support portion 3 that supports the medium M. The printing apparatus 1 according to the present embodiment includes, as the medium support portion 3, a medium support portion 3A, a medium support portion 3B, and a medium support portion 3C from the upstream to the downstream in the conveying direction A. The printing apparatus 1 further includes a roller pair 8 including a driving roller and a driven roller as a conveying unit for conveying the medium M in the conveying direction A on the conveyance path. However, the configuration of the conveying unit is not specifically limited.

Further, the printing apparatus 1 according to the present embodiment includes a head 5 and a carriage 4 at a position facing the medium support portion 3B. The head 5 is a printing unit that is provided with a plurality of nozzles and forms an image by ejecting ink from the nozzles. The carriage 4 is mounted with the head 5 and is reciprocally movable in a width direction B. In the printing apparatus 1 according to the present embodiment, the conveying direction A at a position facing the head 5 on the medium support portion 3B is the +Y direction, the width direction B, which is the moving direction of the head 5, is the direction along the X-axis direction, and the ejecting direction of ink is the −Z direction.

With the configuration described above, the head 5 is configured to form an image by ejecting ink from the nozzles (not illustrated) onto a conveyed medium, while the head 5 reciprocates in the width direction B as a direction intersecting with the conveying direction A. The printing apparatus 1 of the present exemplary embodiment is configured to form a desired image on the medium M by repeating transport of the medium M by a predetermined transport amount in the conveying direction A and ejection of ink in a state in which the medium M is stopped while the head 5 moves in the width direction B. However, in place of the head thus configured, there may be adopted a configuration in which a so-called line head is included. In the line head, nozzles for ejecting ink are provided throughout in the X-axis direction.

The medium support portion 3C of the medium support portions 3 is provided with a heater 21 as a medium heating unit for heating a surface M2 opposite to an image forming surface M1 of the medium M. The heater 21 according to the present embodiment is constituted by an electric heating wire and the like but is not limited to such a configuration. Further, not only the medium support portion 3C but also the medium support portion 3A and the medium support portion 3B may be provided with a medium heating unit that heats the surface M2 opposite to the image forming surface M1 of the medium M.

Furthermore, a drying unit 10 that dries the ink ejected from the head 5 to the image forming surface M1 of the medium M by blowing an airflow F is provided in a portion facing the medium support portion 3C in the conveyance path. The drying unit 10 according to the present embodiment includes an airflow heating unit 11 that heats the airflow F and is configured to be able to blow a heated gas as the airflow F to the image forming surface M1 of the medium M, but is not limited to such a configuration. For example, the drying unit 10 may not include the airflow heating unit and may be configured to send a gas at room temperature to the image forming surface M1 of the media M as the airflow F. Note that the detailed configuration of the drying unit 10 will be described later.

Further, a holding unit 6 is provided downstream of the medium support portion 3C in the conveying direction A. The holding unit 6 is a take-up unit that takes up the medium M conveyed in the conveying direction A into a roll shape to obtain a roll body R2. In the printing apparatus 1 according to the present embodiment, the holding unit 2 and the holding unit 6 have the same configuration, and the holding unit 6 rotates in the rotating direction C. The holding unit 6 is a member to be inserted into a paper core as the winding core of the roll body R2. Referring to FIG. 1, when the holding unit 6 rotates in the rotating direction C, winding is performed so that the image forming surface M1 faces outward. However, the medium M may be wound so that the image forming surface M1 faces inward. In such a case, the holding unit 6 rotates in the direction opposite to the rotating direction C.

As described above, the printing apparatus 1 according to the present embodiment includes the roller pair 8 as a conveying unit that conveys the media M, the head 5 as a printing unit that ejects ink onto the image forming surface M1 of the medium M conveyed by the roller pair 8, and the drying unit 10 that is disposed downstream of the head 5 in the conveying direction A of the medium M and dries the ink ejected from the head 5 onto the image forming surface M1.

Here, the drying unit 10 is a main part of the printing apparatus 1 according to the present embodiment. Therefore, the drying unit 10, which is a main part of the printing apparatus 1 according to the present embodiment, will be described in detail below with reference to FIGS. 2 to 11 in addition to FIG. 1.

Figure 2:
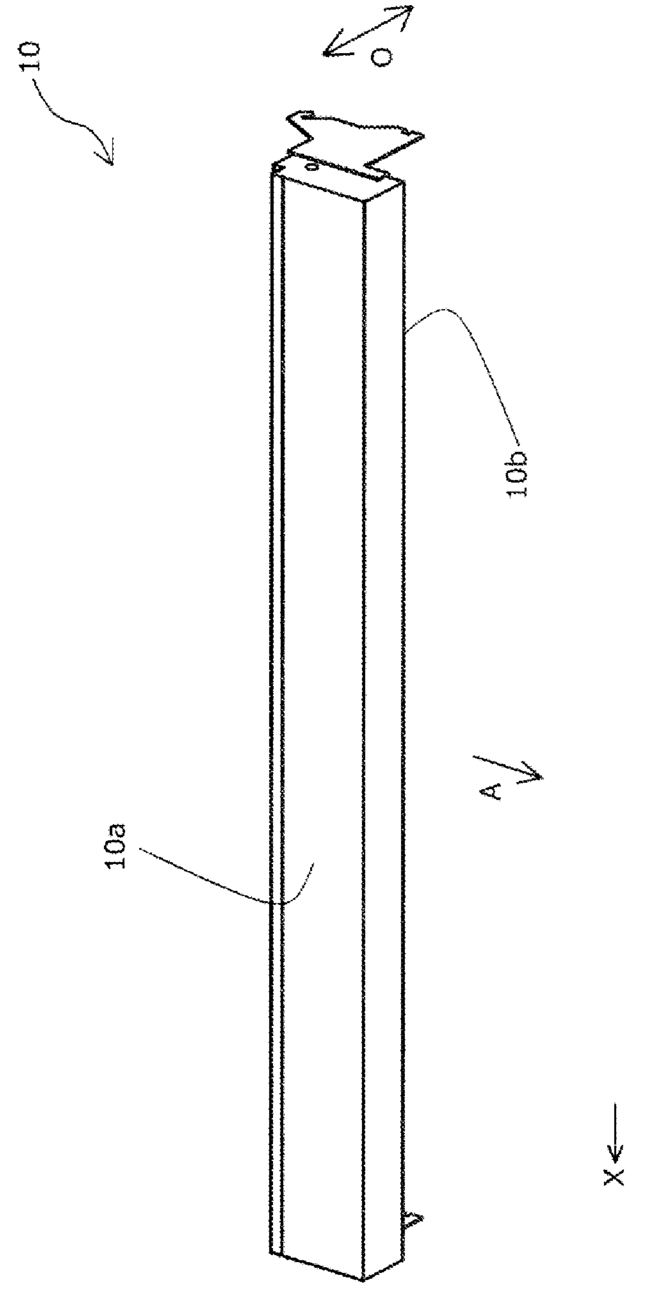
FIG. 2 is a perspective view illustrating the drying unit of the printing apparatus in FIG. 1.
Figure 3:
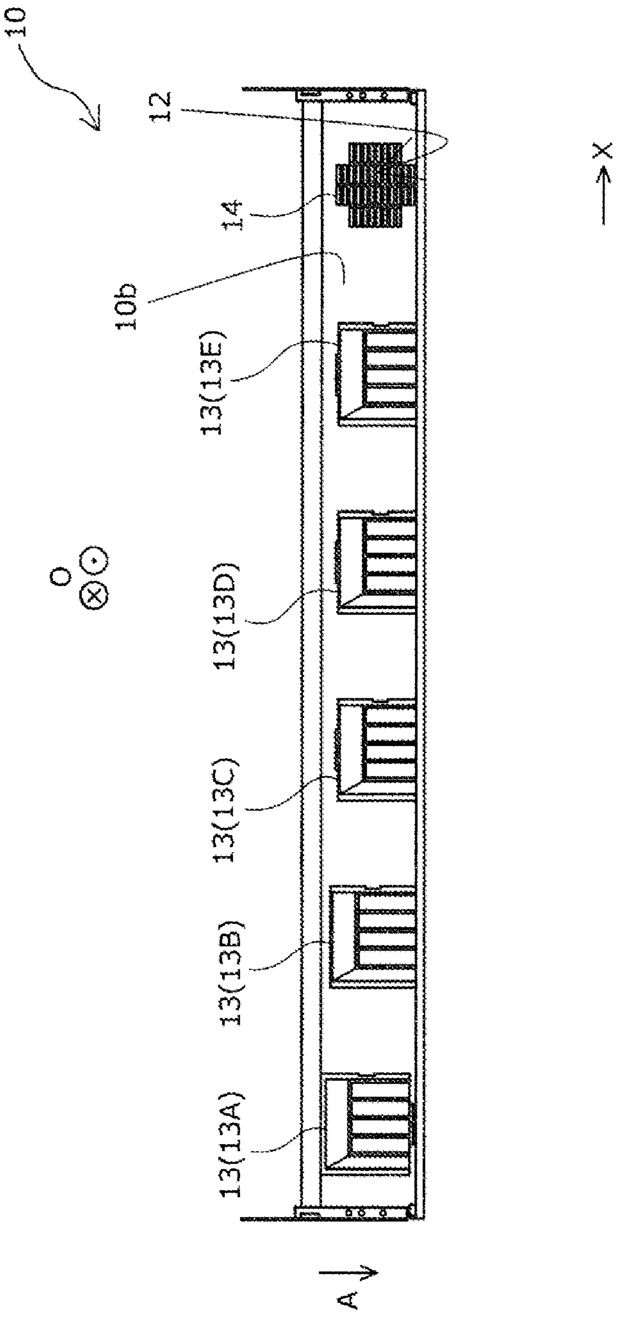
FIG. 3 is a view of the drying unit of the printing apparatus in FIG. 1 as viewed from the bottom surface side.

The drying unit 10 according to the present embodiment extends in the X-axis direction as illustrated in FIGS. 2 and 3 and has an upper surface 10*a* and a bottom surface 10*b* as illustrated in FIGS. 1 to 3. As illustrated in FIG. 3, the bottom surface 10*b* of the drying unit 10 is provided with a fan 12 that generates the airflow F, a blowout port 14 provided at a position facing the fan 12, and a louver 13 attached to the blowout port 14. As illustrated in FIG. 1, the medium support portion 3C is provided at a position facing the bottom surface 10*b* of the drying unit 10 and can also be regarded as constituting a part of the drying unit 10. The direction in which the upper surface 10*a* and the bottom surface 10*b* face each other corresponds to an opposing direction O in which the blowout port 14 faces the image forming surface M1 of the medium M supported by the medium support portion 3C.

In other words, the drying unit 10 according to the present embodiment includes the medium support portion 3C that is a support portion that supports the medium M, the fan 12 as an airflow generating unit that generates the airflow F, the blowout port 14 of the airflow arranged at a position facing the image forming surface M1 of the medium M conveyed by the roller pair 8 that is a conveying unit, and the louvers 13 as airflow direction determining portions that determine the air blowing direction that is the direction of the airflow F blown out from the blowout port 14.

Figure 6:
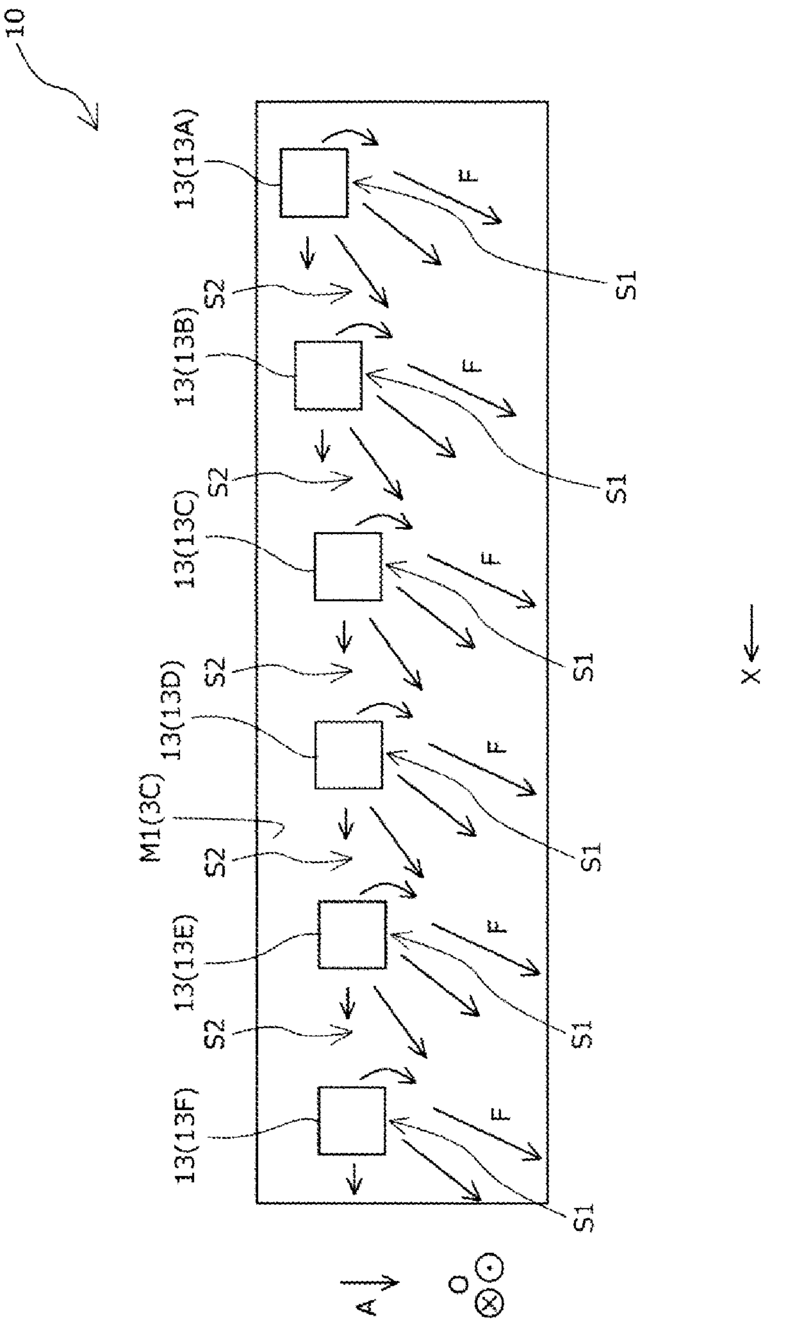
FIG. 6 is a schematic view illustrating airflows generated by the airflow generating unit of the drying unit in FIGS. 2 and 3 and is a perspective view as viewed from the upper surface side of the drying unit in an opposing direction in which a blowout port faces an image forming surface face.
Figure 7:
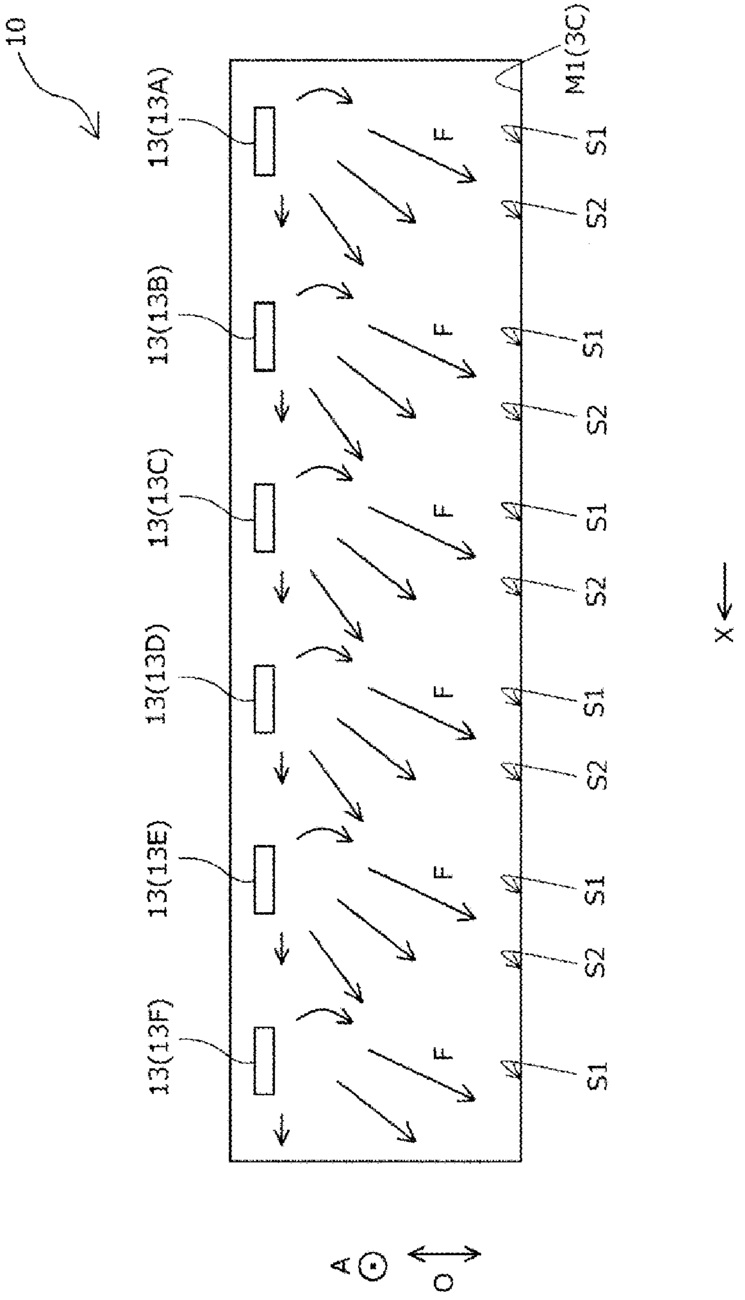
FIG. 7 is a schematic view illustrating airflows by the airflow generating unit of the drying unit in FIGS. 2 and 3 as viewed from the downstream in the conveying direction.

The drying unit 10 according to the present embodiment includes six fans 12, six blowout ports 14, and six louvers 13. The six fans 12, the six blowout ports 14, and the six louvers 13 each have the same shape. Here, as illustrated in FIGS. 6 and 7, the drying unit 10 according to the present embodiment includes, as the louvers 13, a louver 13A, a louver 13B, a louver 13C, a louver 13D, a louver 13E, and a louver 13F from the −X direction side toward the +X direction side. However, referring to FIG. 3, the louver 13F of the louvers 13 is omitted to illustrate the shapes of the fan 12 and the blowout port 14. The shape of the blowout port 14 is not limited to the illustrated shape.

Figure 4:
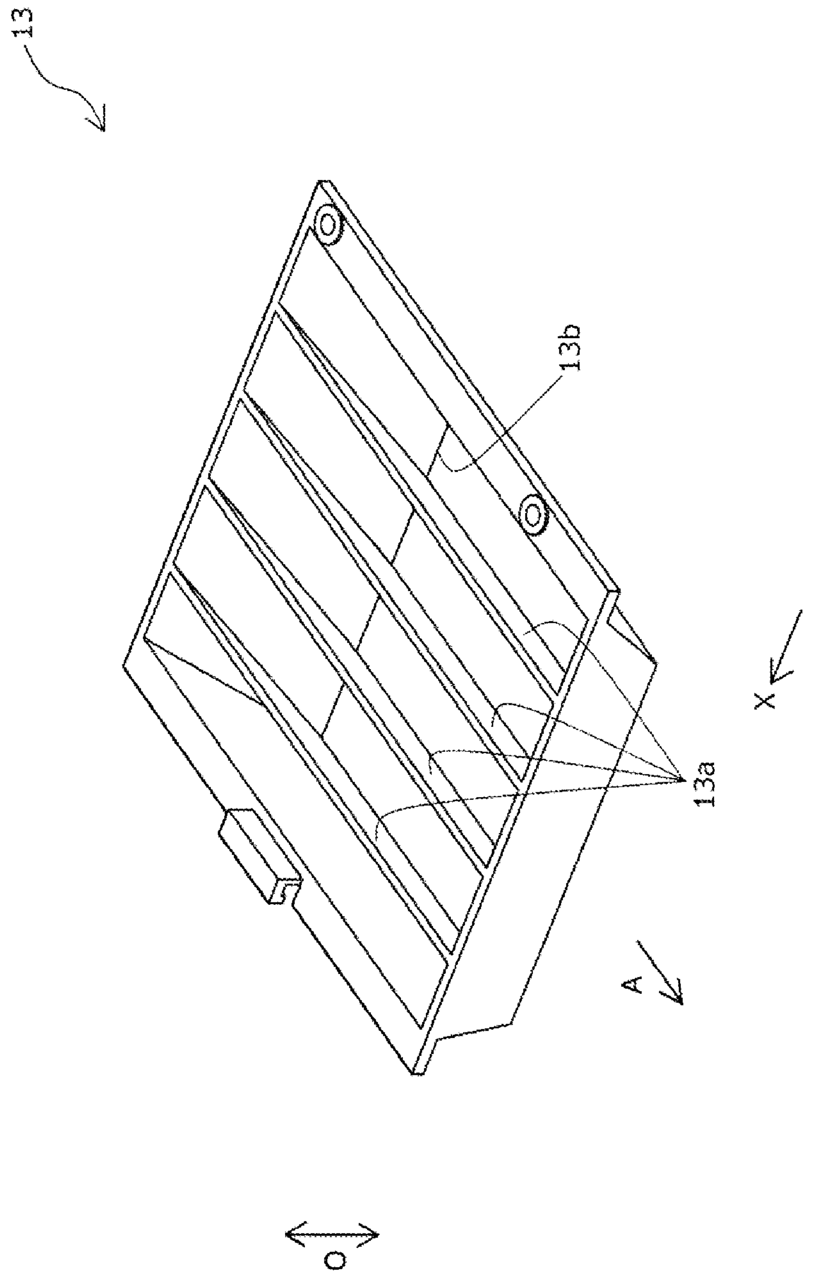
FIG. 4 is a perspective view illustrating the airflow direction determining portion of the drying unit in FIGS. 2 and 3.
Figure 5:
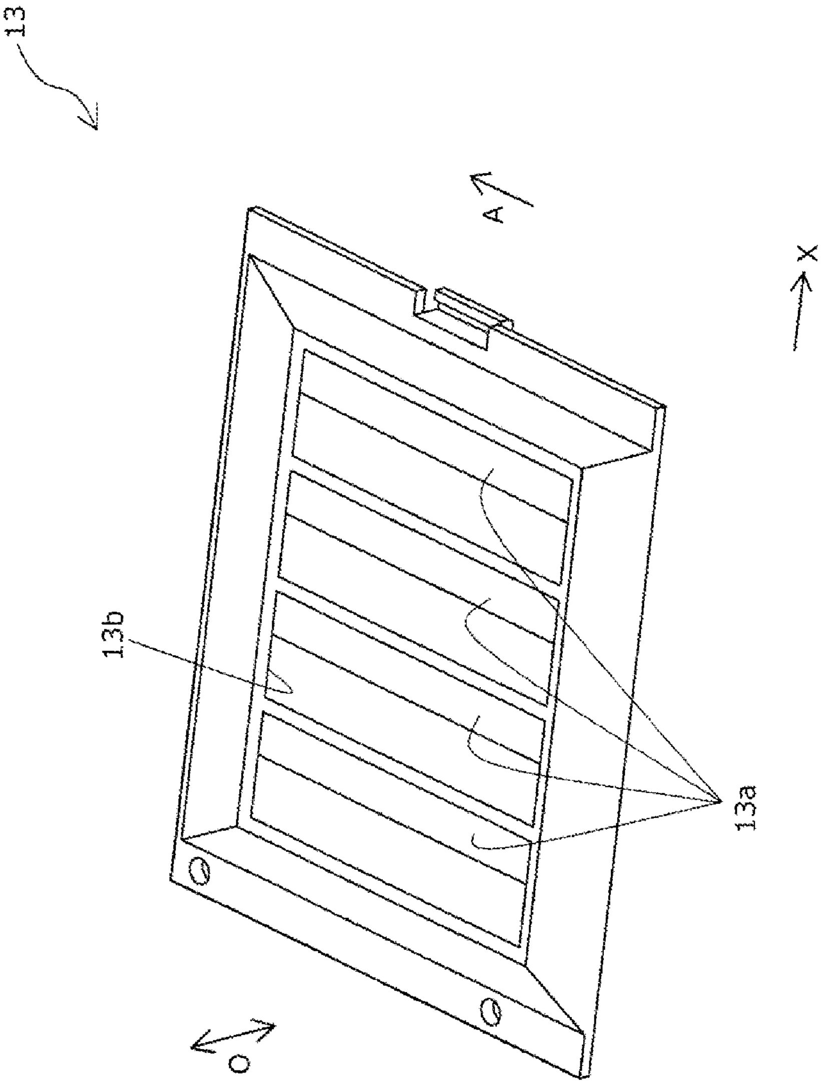
FIG. 5 is a perspective view illustrating the airflow direction determining portion of the drying unit in FIGS. 2 and 3 viewed from an angle different from that in FIG. 4.

As described above, the louver 13 determines the air blowing direction which is the direction of the airflow F blown out from the blowout port 14, but the direction of the airflow F is inclined with respect to the opposing direction O in which the blowout port 14 faces the image forming surface M1 as viewed from the conveying direction A. In other words, the direction of the airflow F is inclined in the width direction B with respect to the opposing direction O in which the blowout port 14 faces the image forming surface M1. As illustrated in FIGS. 4 and 5, the louver 13 has a plurality of feather-like portions 13*a* provided at an opening portion 13*b*, but the feather-like portions 13*a* are inclined from the bottom surface 10*b* side toward the medium support portion 3C as viewed from the conveying direction A so as to be arranged on the +X direction side. Therefore, as illustrated in FIGS. 6 and 7, the airflow F is mainly directed from the −X direction side to the +X direction side on the image forming surface M1 of the medium M.

Figure 10:
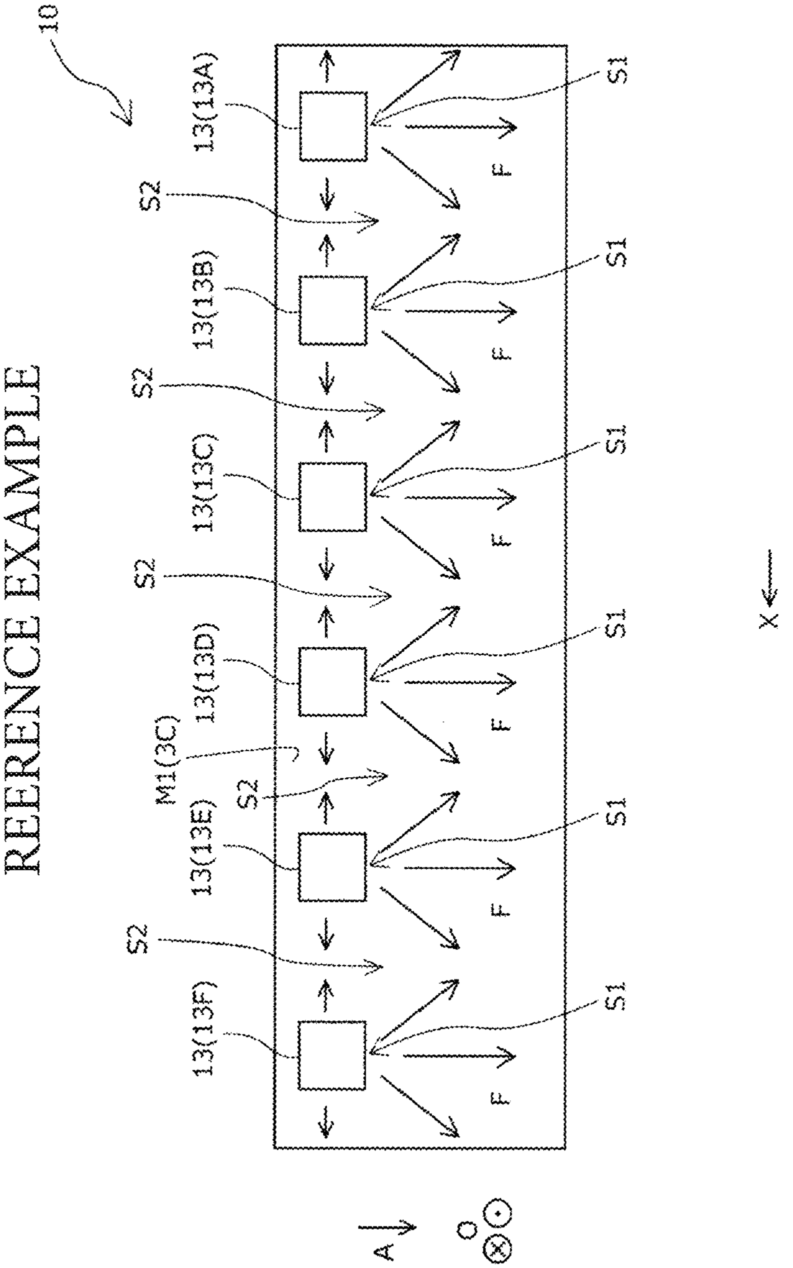
FIG. 10 is a schematic view illustrating airflows generated by the airflow generating unit of the drying unit of a printing apparatus according to a reference example and is a perspective view as viewed from the upper surface side of the drying unit in an opposing direction in which the blowout port faces the image forming surface face.
Figure 11:
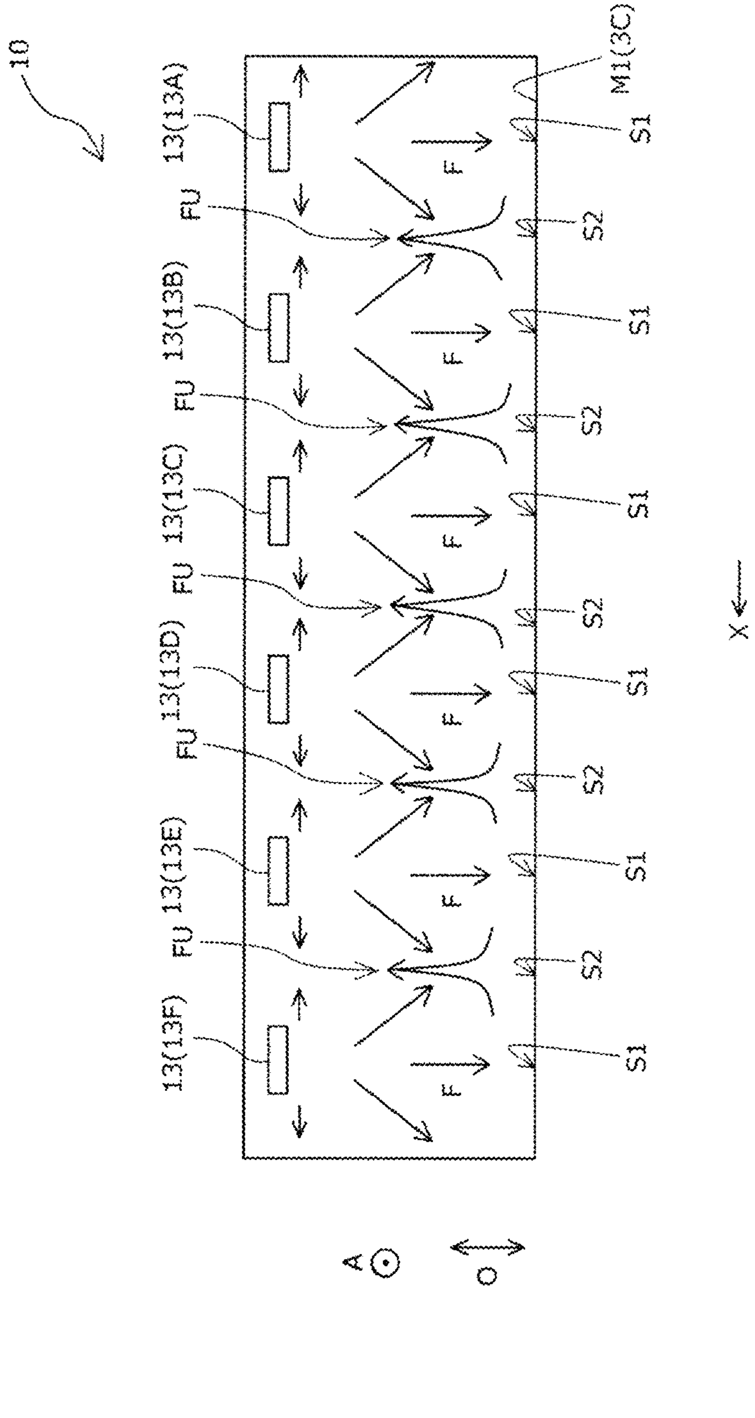
FIG. 11 is a schematic view illustrating airflows by the airflow generating unit of the drying unit of a printing apparatus according to a reference example and is a view as viewed from the downstream in the conveying direction.

In general, as in the printing apparatus according to the reference example without the airflow direction determining portion as illustrated in FIGS. 10 and 11, in the case of a configuration in which the air blowing direction from the drying unit 10 is perpendicular to the opposing direction O in which the blowout port 14 faces the image forming surface M1 as viewed from the conveying direction A, a large difference occurs in wind speed between a region S1 facing the blowout port 14 and a region S2 not facing the blowout port 14, and unevenness is likely to occur in the wind speed distribution. However, as described above, the printing apparatus 1 according to the present embodiment includes the louver 13 that determines an air blowing direction, and the air blowing direction is inclined with respect to the opposing direction O in which the blowout port 14 faces the image forming surface M1 as viewed from the conveying direction A. With such a configuration, as illustrated in FIGS. 6 and 7, it is possible to suppress occurrence of a large difference in wind speed between the region S1 facing the blowout port 14 and the region S2 not facing the blowout port 14. Therefore, the printing apparatus 1 according to the present embodiment can dry the ink ejected on the medium M while suppressing drying unevenness.

Furthermore, in the printing apparatus according to the reference example not including the airflow direction determining portion as illustrated in FIG. 11, the airflows F from the fans 12 adjacent in the region S2 not facing the blowout port 14 collide near the medium support portion 3C to generate an ascending airflow FU. The ascending airflow FU may lift the medium M supported by the medium support portion 3C, and when the medium M is lifted by the medium support portion 3C, for example, the drying effect by the heater 21 provided in the medium support portion 3C may be reduced. On the other hand, in the printing apparatus 1 according to the present embodiment, since the media M is suppressed from being lifted by the medium support portion 3C, it is also possible to suppress a decrease in the drying effect of the heater 21.

The printing apparatus 1 according to the present embodiment includes a plurality of fans 12 as the airflow generating units substantially along the X-axis direction. In other words, in the printing apparatus 1 according to the present embodiment, a plurality of fans are arranged in a direction intersecting the conveying direction A. Thus, the printing apparatus 1 according to the present embodiment can efficiently dry ink with the plurality of fans 12. When the airflow generating unit has a configuration in which the plurality of fans 12 are arranged in a direction intersecting the conveying direction A, the region S1 facing the blowout port 14 and the region S2 not facing the blowout port 14 increase, so that drying unevenness may easily occur. However, since the air blowing direction is inclined with respect to the opposing direction O in which the blowout port 14 faces the image forming surface M1 as viewed from the conveying direction A as described above, the printing apparatus 1 according to the present embodiment can suppress the occurrence of a large difference in wind speed between the region S1 facing the blowout port 14 and the region not facing the blowout port 14 and can dry the ink ejected on the medium M while suppressing the drying unevenness.

Furthermore, in the printing apparatus 1 according to the present embodiment, the blowout port 14 and the louver 13 are provided for each of the plurality of fans 12. For this reason, for example, the wind direction can be adjusted by the louver 13 for each of the plurality of fans 12 as necessary, or the old louver 13 can be replaced for each of the plurality of fans 12.

Furthermore, in the printing apparatus 1 according to the present embodiment, the air blowing direction from the fan

12 is inclined from the upstream to the downstream in the conveying direction A as viewed from the opposing direction O in which the blowout port 14 faces the image forming surface M1 corresponding to FIG. 6. With such a configuration, it is possible to prevent, for example, the airflow F from moving toward the head 5 to shift the ejection position of ink, the warm airflow F from moving toward the head 5 to cause a temperature rise around the head 5, or the airflow F containing the vapor of ink evaporated from the medium M from moving toward the head 5 to cause the vapor of ink to condense and stain the head 5.

As illustrated in FIG. 6, in the printing apparatus 1 according to the present embodiment, the plurality of louvers 13 are provided at the downstream in the conveying direction A toward the louvers 13A, 13B, 13C, 13D, 13E, and 13F. Specifically, the louver 13B is provided downstream of the louver 13A, and the louver 13C is provided downstream of the louver 13B. In addition, the louver 13C, the louver 13D, the louver 13E, and the louver 13F are provided at a straight line in the X-axis direction orthogonal to the conveying direction A. Note that the number of louvers 13 having different positions in the conveying direction A from the other louvers 13 among the plurality of louvers 13 and a difference in position for each louver 13 can be appropriately adjusted. From another point of view, the air blowing direction in the printing apparatus 1 according to the present embodiment is inclined from the upstream to the downstream in the conveying direction A as viewed from the opposing direction O in which the blowout port 14 faces the image forming surface M1 corresponding to FIG. 6, and the louver 13 located more upstream in the air blowing direction substantially corresponding to the +X direction is disposed more upstream in the conveying direction A. With such a configuration, it is possible to suppress the occurrence of a portion FC where the airflow F interferes with the airflow F from the adjacent louver 13 and the flow of the airflow F stagnates, and it is possible to suppress the airflow F from heading toward the head 5 side. When the portion FC where the flow of the airflow F stagnates occurs, a wet gas stagnates and the drying efficiency decreases. Therefore, when the portion FC where the flow of the airflow F stagnates occurs, drying unevenness is likely to occur.

Figure 8:
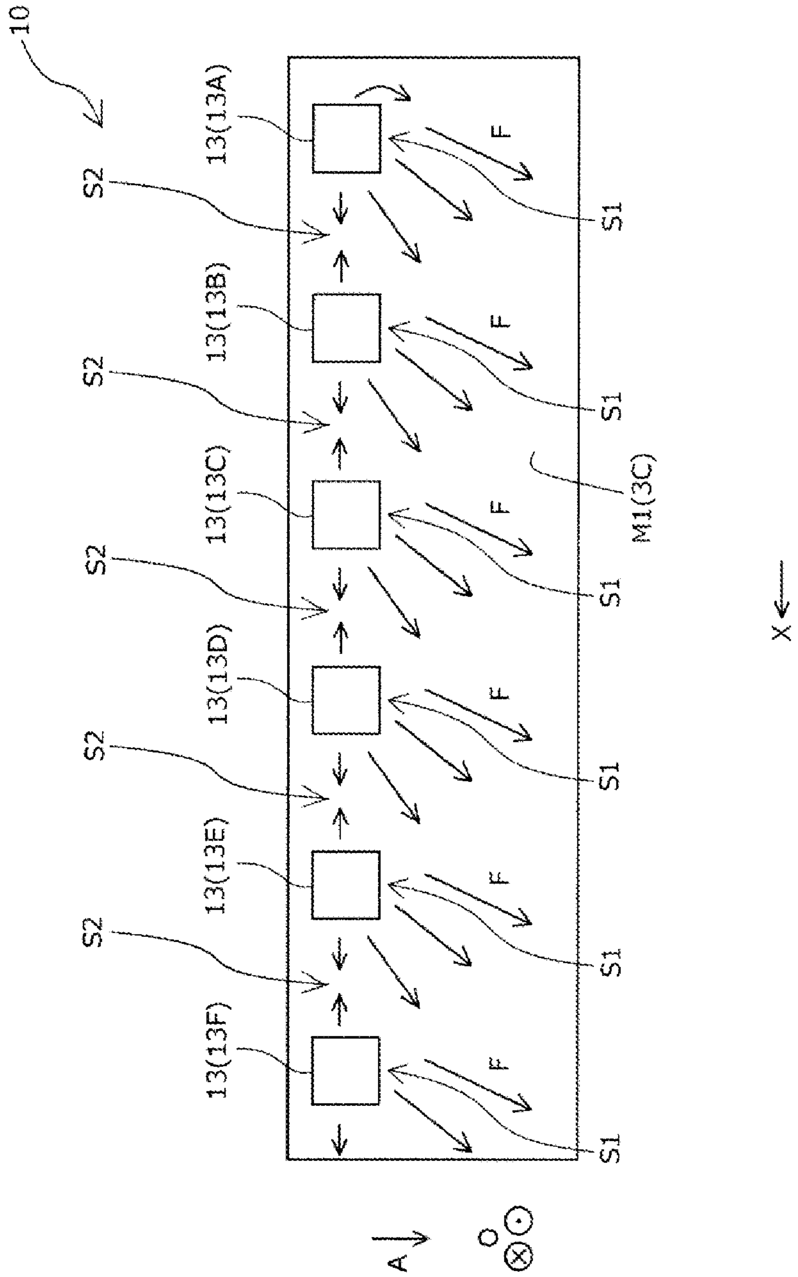
FIG. 8 is a schematic view illustrating airflows generated by the airflow generating unit of the drying unit of a printing apparatus according to an embodiment different from the printing apparatus in FIG. 1 and is a perspective view as viewed from the upper surface side of the drying unit in an opposing direction in which the blowout port faces the image forming surface face.
Figure 9:
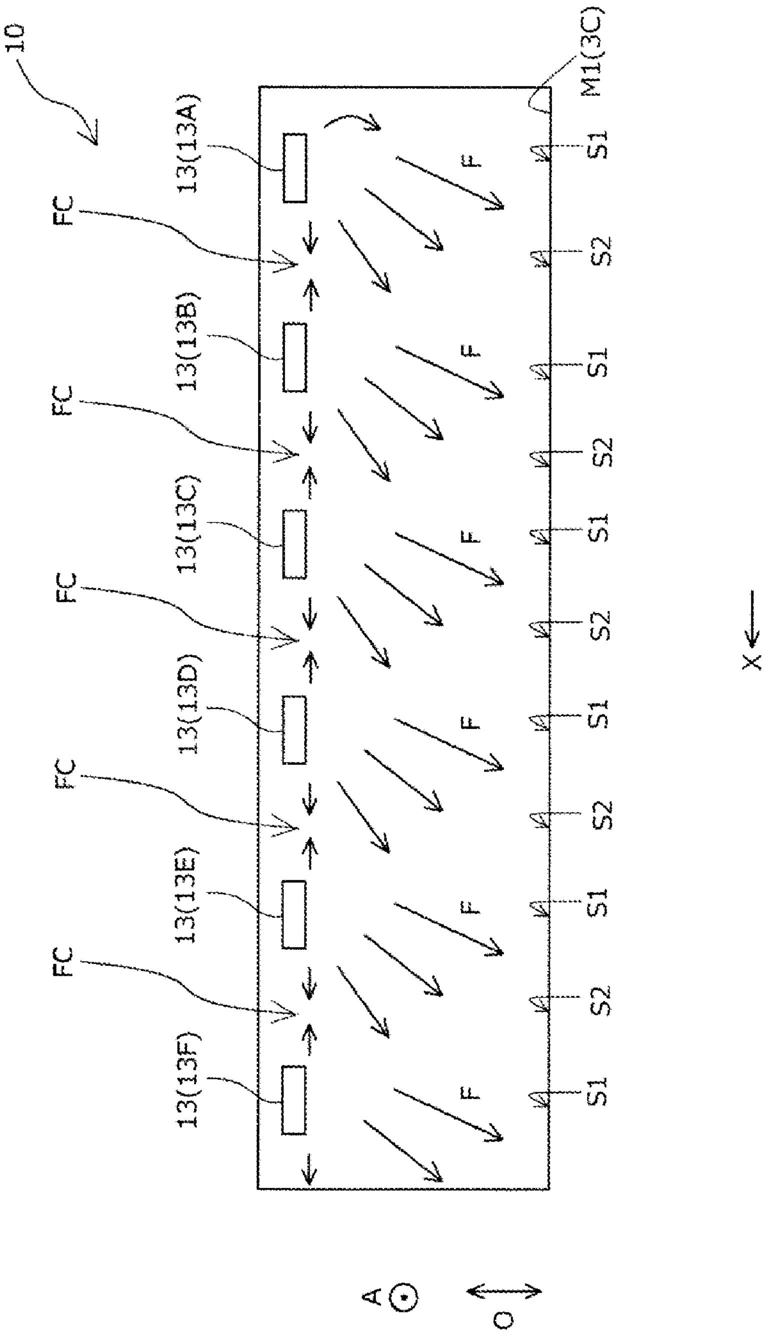
FIG. 9 is a schematic view illustrating airflows by the airflow generating unit of the drying unit of a printing apparatus according to an embodiment different from the printing apparatus of FIG. 1 and is a view as viewed from the downstream in the conveying direction.

Here, FIGS. 8 and 9 illustrate a drying unit 10 of a printing apparatus according to an embodiment different from the printing apparatus 1 according to the present embodiment. Specifically, louvers 13A, 13B, 13C, 13D, 13E, and 13F as a plurality of louvers 13 are arranged on a straight line in the X-axis direction that is a direction orthogonal to a conveying direction A. Here, the configuration of each louver 13 in FIGS. 8 and 9 is the same as the configuration of the louver 13 illustrated in FIGS. 4 and 5. Referring to FIGS. 8 and 9, the louver 13 is inclined so as to be arranged on the +X direction side as it goes from the bottom surface 10*b* side to the medium support portion 3C side as viewed from a conveying direction A. However, even with the louver 13 having such a configuration, a part of an airflow F goes toward the −X direction side.

Referring to FIGS. 6 and 7, even when some of the airflows F flow toward the −X direction side, the airflow F from the adjacent louver 13 on the upstream in the air blowing direction is strong, so that the airflow F flowing toward the −X direction side is directed toward the +X direction side by the airflow F from the adjacent louver 13. This is because the louver 13 on the downstream is disposed at a position where the airflow F from the adjacent louver 13 on the upstream in the air blowing direction is strong. On the other hand, referring to FIGS. 8 and 9, the louver 13 on the downstream is disposed at a position including a position shifted from the position where the airflow F from the adjacent louver 13 on the upstream in the air blowing direction is strong. Therefore, part of the airflow F directed toward the −X direction side collides with the airflow F from the adjacent louver 13 on the upstream in the air blowing direction, and a portion FC where the airflow F stagnates as illustrated in FIG. 9 is generated.

As described above, it is preferable that the air blowing direction is inclined from the upstream to the downstream in the conveying direction A as viewed from the opposing direction O in which a blowout port 14 faces an image forming surface M1 corresponding to FIG. 6, and the blowout port 14 on the upstream in the air blowing direction substantially corresponding to the +X direction is disposed on the upstream in the conveying direction A. However, even in the configuration illustrated in FIGS. 8 and 9, the ink ejected onto the medium M can be dried while drying unevenness is suppressed as compared with the configuration illustrated in FIGS. 10 and 11.

In the printing apparatus 1 according to the present embodiment, it is possible to use, as the media M, a first medium and a second medium having different lengths in a width direction B intersecting the conveying direction A. Then, the printing apparatus 1 conveys media M while positioning the first medium and the second medium at the same position on the −X direction side as one side in the width direction B. Specifically, a roller pair 8 as a conveying unit is configured to be able to convey the medium M while positioning the first medium and the second medium at the same position on the −X direction side as one side in the width direction B. A holding unit 2 that holds a roll body R1 may position the first medium and the second medium at the same position on the −X direction side as one side in the width direction B. As illustrated in FIG. 7, the air blowing direction is inclined from the −X direction side, which is one side in the width direction B, toward the +X direction side, which is the other side, as viewed from the conveying direction A.

In a configuration in which the first medium and the second medium having different lengths in the width direction B can be used as the media M, when any one of the media M is used and, for example, an end portion of the medium M in the width direction B is located in a region S2 not facing the blowout port 14, the end portion is easily turned up under the influence of the airflow F. In particular, in a case in which the end portion is disposed in a region where an ascending airflow FU is generated as illustrated in FIG. 11, the end portion is easily turned up. However, the printing apparatus 1 according to the present embodiment generates the airflow F so as to be directed from one side, which is a side where the medium M is positioned in the width direction B, to the other side. With such a configuration, for example, since the occurrence of the ascending airflow FU can be suppressed, regardless of using any of the media M having different lengths in the width direction B, it is possible to prevent the end portion of the medium M in the width direction B from being turned up under the influence of the airflow F. Note that "it is possible to use, as the media M, a first medium and a second medium having different lengths in a width direction B intersecting the conveying direction A." includes not only a configuration that can use the media M with two types of lengths in the width direction B but also a configuration that can use the media M with three or more types of lengths in the width direction B.

As described above, the printing apparatus 1 according to the present embodiment includes the heater 21 as a medium heating unit that heats the medium M from the side opposite to the image forming surface M1. Therefore, by heating the media M from the side opposite to the image forming surface M1, the printing apparatus 1 according to the present embodiment can particularly efficiently dry the ink ejected onto the media M while suppressing drying unevenness.

As described above, the printing apparatus 1 according to the present embodiment includes the airflow heating unit 11 that heats the airflow F. Therefore, by heating the airflow F, the printing apparatus 1 according to the present embodiment can particularly efficiently dry the ink ejected onto the media M while suppressing drying unevenness.

The present disclosure is not limited to the above-described examples, and can be realized in various configurations without departing from the spirit of the present disclosure. Further, technical characteristics in the embodiment corresponding to the technical characteristics in each form described in SUMMARY can be substituted or combined appropriately to solve some or all of the above-described problems, or to achieve some or all of the above-described effects. Further, when the technical characteristics are not described as being essential in the present specification, the technical characteristics can be deleted as appropriate.

What is claimed is:

1. A printing apparatus comprising:

a conveying unit that conveys a medium;

a printing unit that ejects ink onto an image forming surface of the medium conveyed by the conveying unit; and a drying unit that is disposed downstream of the printing unit in a conveying direction of the medium and dries the ink ejected from the printing unit onto the image forming surface, the drying unit extending in a width direction transverse to the conveying direction of the medium with a first width end and a second width end, wherein the drying unit includes a support portion that supports the medium, an airflow generating unit that generates an airflow, a blowout port that is disposed at a position facing the image forming surface of the medium conveyed by the conveying unit and blows out the airflow, and an airflow direction determining portion that directs the airflow in a plurality of air blowing directions, wherein the blowout port faces the image forming surface of the medium conveyed by the conveying unit in an opposing direction, and the airflow direction determining portion comprising louvers to direct the airflow in a first air blowing direction of the plurality of air blowing directions that is inclined in the width direction with respect to the opposing direction and a second air blowing direction of the plurality of air blowing directions that is parallel to the width direction at one of the first width end and the second width end.

2. The printing apparatus according to claim 1, wherein the airflow generating unit includes a plurality of fans arranged in a direction intersecting the conveying direction.

3. The printing apparatus according to claim 2, wherein the blowout port and the airflow direction determining portion are provided for each of the plurality of fans.

4. The printing apparatus according to claim 3, wherein the first air blowing direction is inclined from upstream to downstream in the conveying direction when viewed from the opposing direction, and the airflow direction determining portion associated with one of the plurality of fans is located more upstream in the first air blowing direction and more upstream in the conveying direction than another airflow direction determining portion associated with another one of the plurality of fans.

5. The printing apparatus according to claim 1, wherein the first air blowing direction is inclined from upstream to downstream in the conveying direction when viewed from the opposing direction.

6. The printing apparatus according to claim 1, wherein a first medium and a second medium having different lengths in a width direction intersecting the conveying direction are configured to be used as the media, and the media are conveyed while the first medium and the second medium are positioned at the same position on one side in the width direction, the air blowing direction is inclined from the one side to the other side in the width direction when viewed from the conveying direction.

7. The printing apparatus according to claim 1, further comprising a medium heating unit that heats the medium from a side opposite to the image forming surface.

8. The printing apparatus according to claim 1, further comprising an airflow heating unit that heats the airflow.

9. A printing apparatus comprising:

a conveying unit that conveys a medium;

a printing unit that ejects ink onto an image forming surface of the medium conveyed by the conveying unit; and a drying unit that is disposed downstream of the printing unit in a conveying direction of the medium and dries the ink ejected from the printing unit onto the image forming surface, the drying unit extending in a width direction transverse to the conveying direction of the medium with a first width end and a second width end, wherein the drying unit includes a support portion that supports the medium, an airflow generating unit that generates an airflow, a blowout port that is disposed at a position facing the image forming surface of the medium conveyed by the conveying unit and blows out the airflow, and an airflow direction determining portion that directs the airflow in a plurality of air blowing directions, wherein the blowout port faces the image forming surface of the medium conveyed by the conveying unit in an opposing direction, and a first air blowing direction of the plurality of air blowing directions is inclined in the width direction with respect to the opposing direction and a second air blowing direction of the plurality of air blowing directions is perpendicular to one of the first width end and the second width end, wherein the airflow generating unit includes a plurality of fans arranged in a direction intersecting the conveying direction, wherein the blowout port and the airflow direction determining portion are provided for each of the plurality of fans, wherein the first air blowing direction is inclined from upstream to downstream in the conveying direction when viewed from the opposing direction, and the airflow direction determining portion associated with one of the plurality of fans is located more upstream in the first air blowing direction and more upstream in the conveying direction than another airflow direction determining portion associated with another one of the plurality of fans.

10. The printing apparatus according to claim 9, wherein the first air blowing direction is inclined from upstream to downstream in the conveying direction when viewed from the opposing direction.

11. The printing apparatus according to claim 9, wherein a first medium and a second medium having different lengths in a width direction intersecting the conveying direction are configured to be used as the media, and the media are conveyed while the first medium and the second medium are positioned at the same position on one side in the width direction, the air blowing direction is inclined from the one side to the other side in the width direction when viewed from the conveying direction.

12. The printing apparatus according to claim 9, further comprising a medium heating unit that heats the medium from a side opposite to the image forming surface.

13. The printing apparatus according to claim 9, further comprising an airflow heating unit that heats the airflow.

* * * * *